United States Patent
Belongia

[19]

[11] Patent Number: 6,066,239
[45] Date of Patent: May 23, 2000

[54] WATER DISTILLER WITH IMPROVED SOLIDS-REMOVING BAFFLE DEVICE

[75] Inventor: David C. Belongia, Kewaskum, Wis.

[73] Assignee: The West Bend Company, West Bend, Wis.

[21] Appl. No.: 08/819,764

[22] Filed: Mar. 18, 1997

[51] Int. Cl.⁷ ............................... B01D 3/02; C02F 1/04
[52] U.S. Cl. ........................... 203/10; 55/434.2; 55/436; 95/267; 96/189; 96/220; 137/547; 202/197; 203/40
[58] Field of Search .................... 203/10, 20, 40; 159/DIG. 41; 202/181, 188, 197, 200; 95/267; 96/189, 220; 55/434.2, 436; 137/544–549

[56] References Cited

U.S. PATENT DOCUMENTS

| | | |
|---|---|---|
| 1,316,214 | 9/1919 | Wright, Jr. ............................... 202/197 |
| 2,649,408 | 8/1953 | Williamson et al. .................... 202/197 |
| 2,816,064 | 12/1957 | Smith ...................................... 202/188 |
| 4,108,718 | 8/1978 | Rickey, Jr. et al. ............. 159/DIG. 16 |
| 4,248,672 | 2/1981 | Smith . | 
| 4,302,227 | 11/1981 | Miller ....................................... 55/269 |
| 4,342,625 | 8/1982 | Dennison . |
| 4,657,566 | 4/1987 | Wintering et al. ........................... 55/73 |
| 4,770,748 | 9/1988 | Cellini et al. ............................ 202/197 |
| 5,118,710 | 6/1992 | Weber et al. .............................. 203/10 |
| 5,536,375 | 7/1996 | Vogelman ................................ 202/197 |
| 5,762,762 | 6/1998 | Breithaupt et al. ................... 202/185.3 |

FOREIGN PATENT DOCUMENTS

| | | |
|---|---|---|
| 12053/83 | 3/1983 | Australia . |
| 44909/85 | 8/1988 | Australia . |
| 41986/89 | 1/1993 | Australia . |
| 0040037 | 11/1981 | European Pat. Off. . |
| 0334286 | 9/1989 | European Pat. Off. . |
| 3815039 C1 | 4/1989 | Germany . |
| 1053777 | 1/1967 | United Kingdom . |
| 1238487 | 7/1971 | United Kingdom . |

Primary Examiner—Virginia Manoharan
Attorney, Agent, or Firm—Michael Best & Friedrich LLP

[57] ABSTRACT

A new baffle device for a distiller has a tubular body and a baffle member fixed with respect to such body. The baffle member has a plurality of apertures for stripping dissolved solids from steam passing through the member. The distiller raw water vessel has a steam discharge nozzle and the baffle device extends part way into and is in telescoped engagement with the nozzle. The device is held in place by a retention ring and both the ring and the device are quickly removable from the raw water vessel for easy cleaning of the device and the vessel. The distiller has a condensing platform with a steam receiving port built into it. When the raw water vessel is on the platform in the water-boiling position, the baffle device extends between the nozzle and the port and forms a conduit for steam to flow to the condensing coil.

23 Claims, 7 Drawing Sheets

WATER DISTILLER WITH IMPROVED SOLIDS-REMOVING BAFFLE DEVICE

FIELD OF THE INVENTION

This invention is related generally to liquid purification and, more particularly, to separation of impurities from drinking water by distillation.

BACKGROUND OF THE INVENTION

Reasonably-pure drinking water is an absolute necessity of life and clean, fresh-tasting drinking water is one of its pleasures. Most persons in well-developed countries like the United States have access to safe, reasonably-pure drinking water. But even in areas having water suitable for human consumption, such water may contain minerals, e.g., iron and calcium, and/or chemicals and other substances.

While such non-water constituents may not be harmful to humans, they often impart an unpleasant taste or odor to the water. And normally-high-quality drinking water sometimes contains bacteria or other microorganisms which may impart a bad taste to the water or otherwise impair its quality. Often, such an eventuality results from a temporary deficiency in the water treatment facility.

One well-known approach for removing impurities from drinking water is distillation. Distillation involves boiling water to form water vapor and then cooling such vapor to a temperature below the condensation temperature, i.e., below about 212° F. The resulting liquid, sometimes referred to as condensate or distillate, is collected for drinking or the like. Distillation separates pure water from the entrained minerals and other potentially bad-tasting impurities. And quite aside from improving the sensory quality of water, the high temperatures involved in the process are sufficient to kill many types of potentially-harmful microorganisms.

Water distillers commonly use a heating coil to boil, as steam, the water from a raw water container. A fan blows air across condensing coils which cools the steam and condenses it back to now-purified water.

Commonly, water which is being distilled has some usually-modest quantity of solids dissolved in it. Calcium is an example. As water is boiled, some (but not all) of these dissolved solids "settle out" of the water and gravitate to the bottom of the boiling tank as visible particles. As the water boils away, steam carries the remaining (but undesirable) dissolved solids along.

A way to "strip" such dissolved solids from the flow of steam is to pass such steam through a relatively-long vertical columnar path. Since some small-but-significant pressure is required to move the steam along the path, the increased pressure at the bottom of the column has been found to cause dissolved solids to settle out of the steam. While the arrangement shown in U.S. Pat. No. 4,261,796 (Lemoine) might suggest such a purpose, the patent explains that the vertical arrangement permits gravity flow of input water and distilled water so that no pump is necessary.

Another way to strip dissolved solids from the flow of steam is to use baffles or the like to create a serpentine steam path. This technique is similar in operating principle to the vertical column approach discussed above and for column pressure-increasing purposes, retains the "apparent" length of the columnar path while shortening its actual length.

FIG. 6 of U.S. Pat. No. 4,045,293 (Cooksley) suggests this technique but an analysis of the specification makes it clear that what is being depicted is a heat exchanger having a spiral tube element. It is known that using such an element increases the heat-exchange surface area without significantly increasing heat exchanger size.

The water purification apparatus of the Cooksley patent has a baffle installed between a boiling tank and a stack, the base of which is attached to the tank by welding. However, such baffle is apparently not provided for the purpose of stripping dissolved solids from steam. Rather, the baffle is said to remove water droplets from steam vapor.

A disadvantage of known apparatus for stripping dissolved solids from steam is that they occupy very substantial volumetric space. While this may not be objectionable in a commercial water distiller, a household consumer is quite unlikely to purchase a distiller having a tall "stack." And the reluctance to purchase is likely not to be diminished by shortening the stack and configuring a serpentine path therein. The consumer wants and expects a countertop distiller, i.e., a distiller which has a height less than the distance between a kitchen counter and the cupboards above such counter, typically 16 inches (about 41 cm.).

Another disadvantage of such known apparatus is that they are relatively expensive to manufacture. And, of course, cost of manufacture is reflected in the purchase price to the user.

Yet another disadvantage of such known apparatus is that periodic cleaning is difficult, even with a smooth-tube long column. And in an apparatus with a serpentine path, solids tend to coat path surfaces and are difficult to reach and dislodge, at least merely because the path is serpentine.

Still another disadvantage of known apparatus is that given the column length of the apparatus, steam cooling is likely to occur and, with it, condensation. While such condensation is not, per se, objectionable, some condensate is likely to trickle back into the boiling tank. This is inefficient—the objective is to put distilled water into a pure-water container, not back into the boiling tank.

A countertop distiller with an improved solids-removing baffle arrangement that addresses shortcomings of the prior art would be a distinct technical advance.

OBJECTS OF THE INVENTION

It is an object of the invention to provide an improved distiller baffle arrangement for stripping dissolved solids from steam.

Another object of the invention is to provide an improved distiller baffle arrangement which overcomes problems and shortcomings of the prior art.

Another object of the invention is to provide an improved distiller baffle device which is easily removed for cleaning.

Yet another object of the invention is to provide an improved distiller baffle arrangement which avoids stripping columns and stacks.

Another object of the invention is to provide an improved distiller baffle arrangement which is easy and inexpensive to manufacture. How these and other objects are accomplished will become apparent from the following descriptions and from the drawings.

SUMMARY OF THE INVENTION

A baffle device for a distiller includes a tubular body having a retention shoulder around it and first and second tube portions extending in opposite directions away from the shoulder. Each tube portion is tapered from a maximum diameter at the shoulder to smaller diameters at the first and second body ends, respectively.

3

The device has a baffle member for stripping dissolved solids from steam passing through it. Such member is fixed with respect to the body and, more particularly, is fixed with respect to the first tube portion and is at the first tube end. Placement of the baffle member at an easily-accessible tube end facilitates cleaning of such member. The baffle member has a plurality of passages through it and in a highly preferred embodiment, such passages are circular.

In another aspect of the invention, the device is preferably used with a raw water vessel having a generally tubular steam discharge nozzle extending generally horizontally therefrom. The baffle device body is in and in telescoped engagement with the nozzle.

A retention article is mounted to the nozzle and is in overlapping engagement with the retention shoulder. Such article, preferably a screw-on ring, secures the body with respect to the nozzle.

In yet another aspect of the invention, the raw water vessel and baffle device are used with the preferred water distiller having the condensing platform with a steam receiving port formed in such platform. When the vessel, with baffle device attached, is positioned in the platform for water boiling and distilling, the baffle device extends between the port and the nozzle and connects them together for flowing steam therethrough.

Other details of the new baffle device and the related distiller and its raw water vessel are set forth in the following detailed description and in the drawings.

DETAILED DESCRIPTION OF PREFERRED EMBODIMENTS

The first part of this specification is a brief overview description of the distiller. Such description is followed by descriptions of the thermostatic control circuit, the automatic shutoff feature and the detachable solids-removing baffle arrangement.

OVERVIEW

Figure 1:
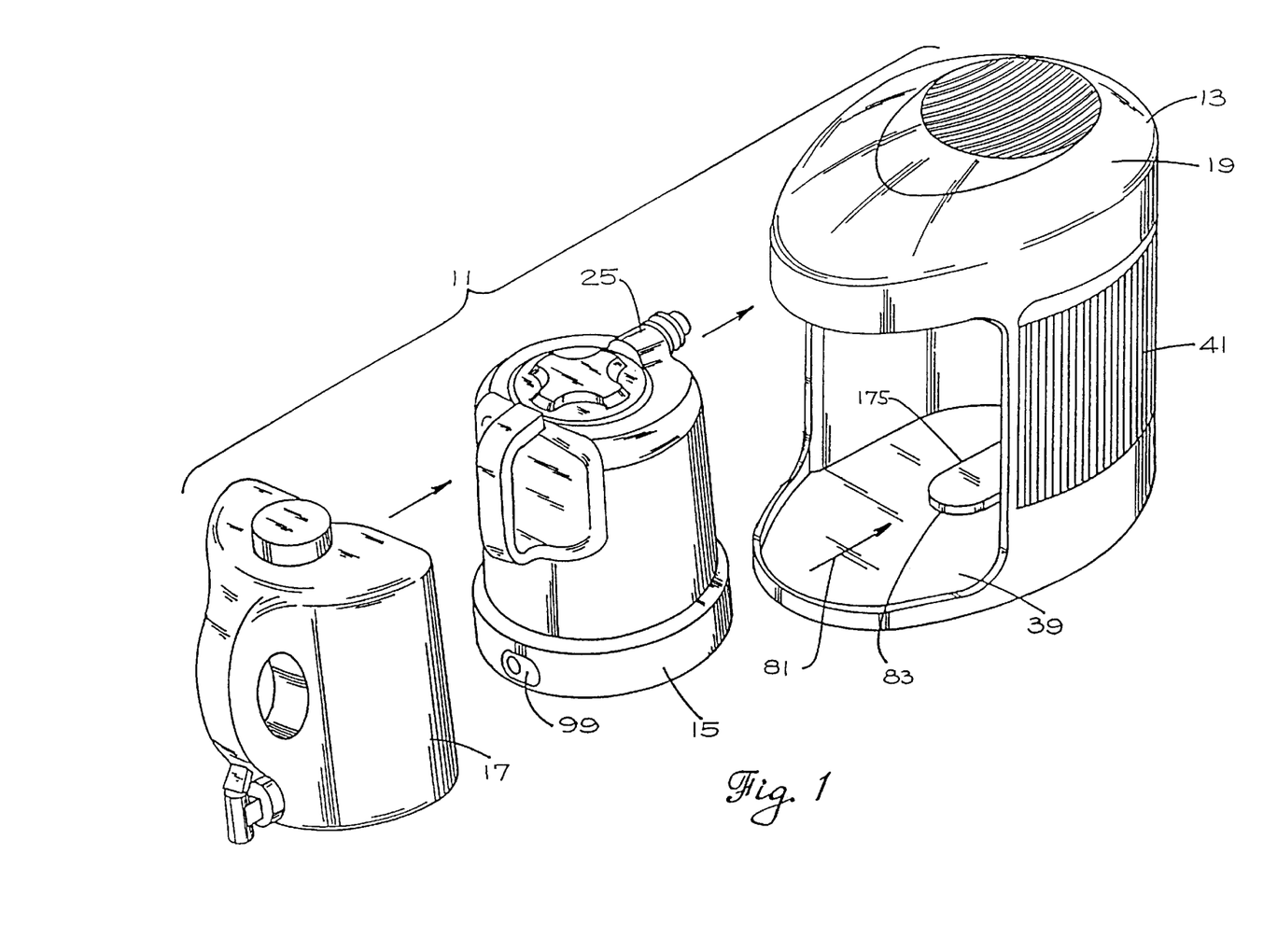
FIG. 1 is a perspective exploded view of the new countertop distiller including its condensing platform, raw water vessel and distillate container.

Referring first to FIGS. 1 (perspective view), 2 (side X-section), 3 (end X-section) and 4 (elec.ckt.), the control circuit 10 is used in a distiller 11 having a condensing platform 13, a raw water vessel 15 and a distillate container 17. A highly preferred embodiment of the distiller 11 is configured as a household or consumer appliance of the type often referred to as a countertop distiller. To use the distiller 11, the vessel 15 and the container 17 are mounted in the platform 13 in that order.

Figure 2:
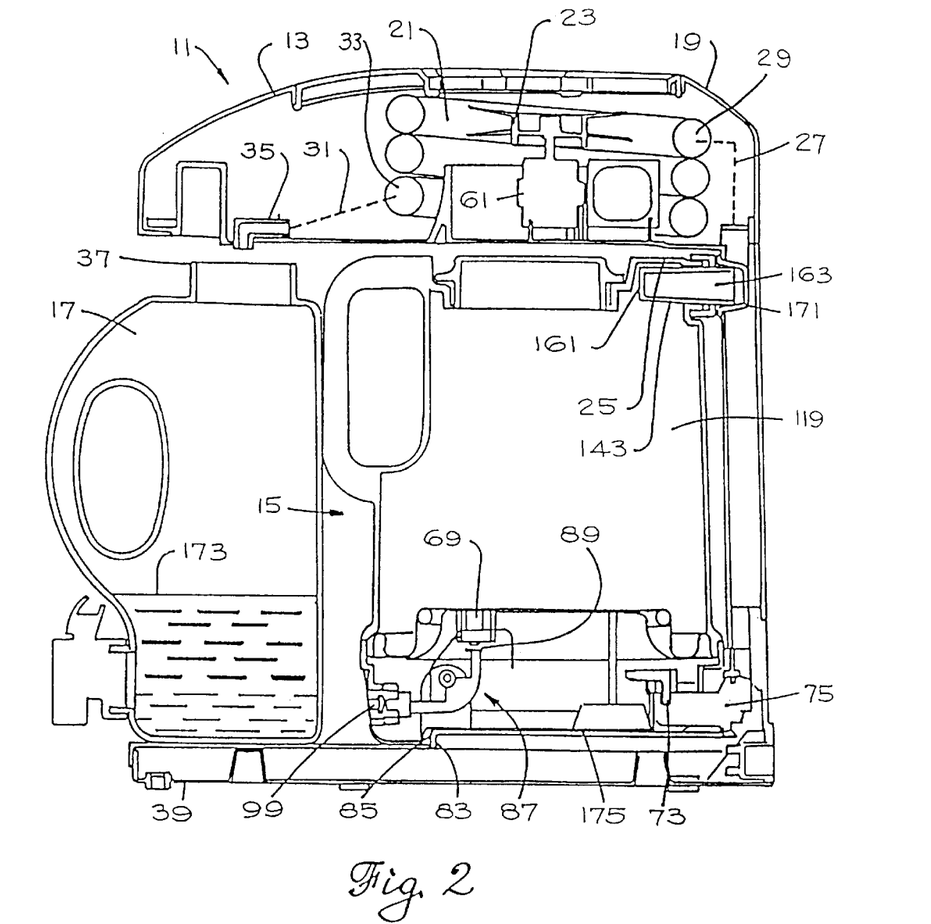
FIG. 2 is a side elevation view, in section, of the distiller. Certain parts are represented in dashed line.
Figure 3:
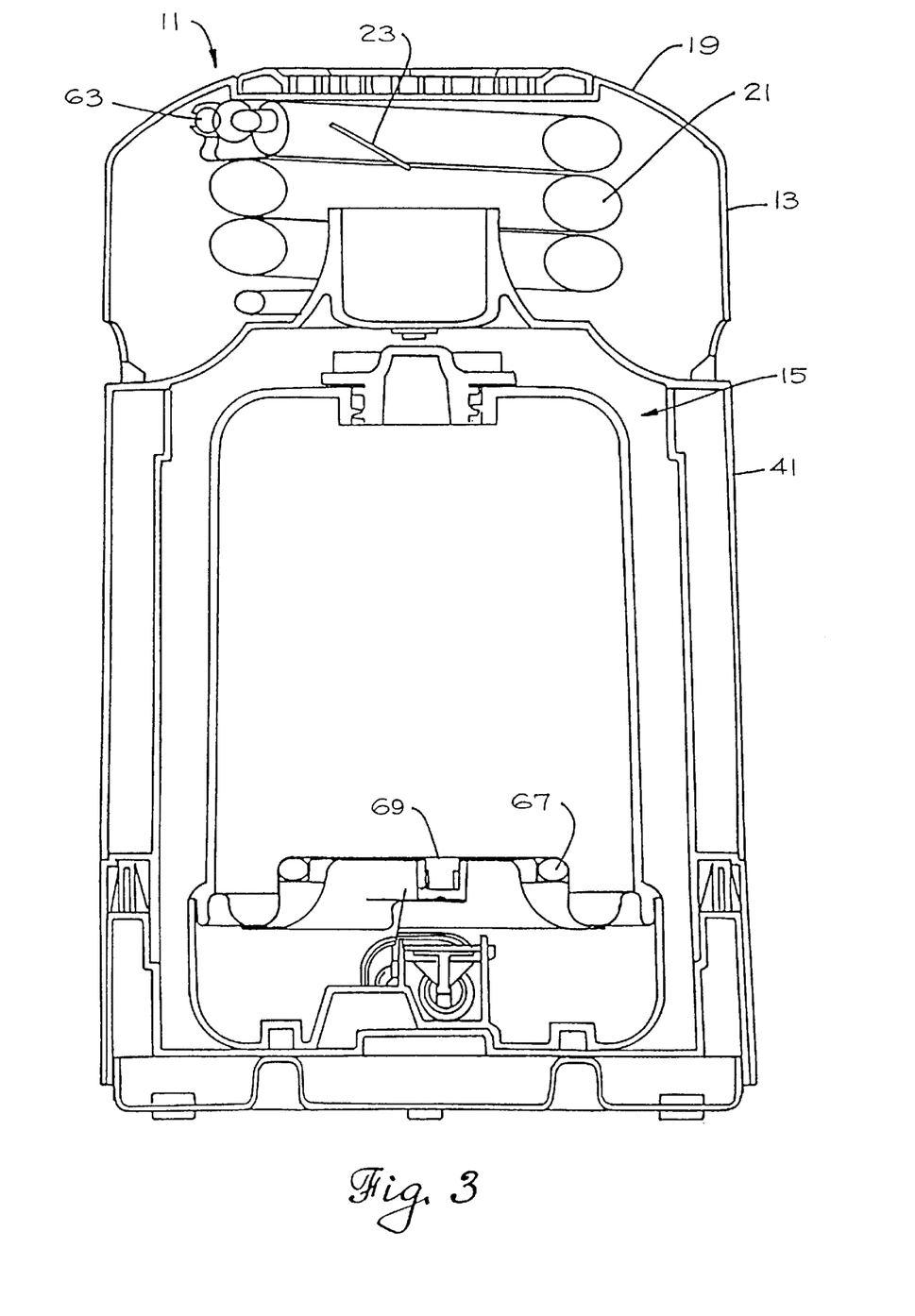
FIG. 3 is a rear elevation view, in section, of the distiller.

The condensing platform 13 has a condensing hood 19 in which are mounted the spiral condensing coil 21 (embodied as a fin-and-tube heat exchanger) and the cooling fan 23 coaxial with and circumscribed by such coil 21. Steam is expelled from the vessel output nozzle 25 and flows through a tube 27 to the input end 29 of the coil 21. Another tube 31 is attached to the output end 33 of the coil 21 and directs the condensate to a duct 35 from which such condensate drips into the open mouth 37 of the container 17. Preferred tubes 27, 31 are of silicone rubber, durometer Shore A 45–55.

The hood 19 is cantilever mounted and extends over and is spaced above the distiller base 39. A rigid shroud 41 extends between the hood 19 and the base 39 and joins them to one another.

THERMOSTATIC CONTROL CIRCUIT

Figure 4:
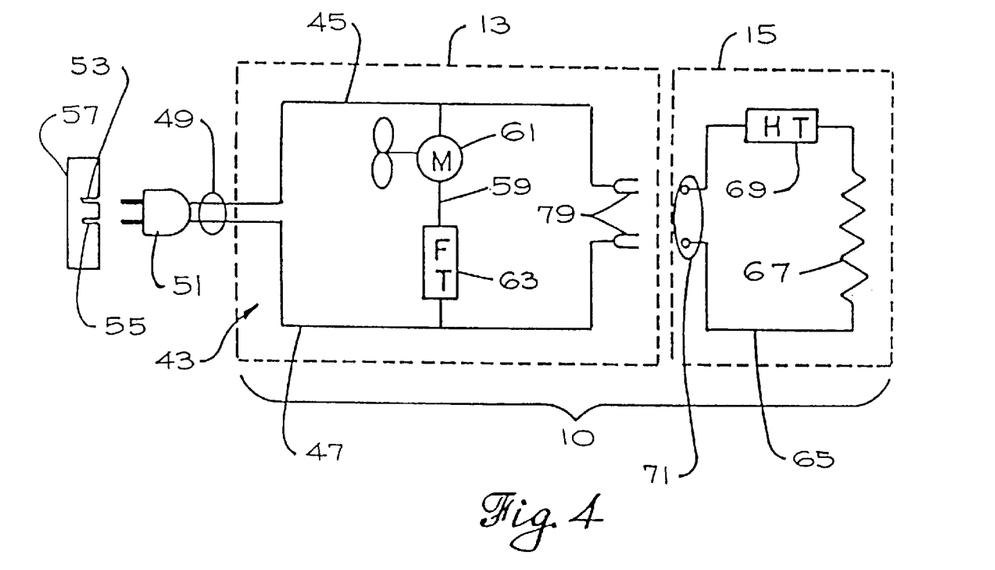
FIG. 4 is a schematic diagram of the electrical control circuit of the distiller.

Referring particularly to FIGS. 2, 3 and 4, the circuit 10 includes a power bus comprising first and second lines 45, 47, respectively, which are connected to an electric cord 49 and plug 51. During distillation, the plug 51 engages "hot" and neutral terminals 53 and 55, respectively, of, e.g., a residential wall outlet 57.

A fan circuit 59 is mounted in and fixed with respect to the condensing platform 13, is permanently connected across the first and second lines 45, 47 and comprises the fan motor 61 and a fan thermostat 63 in series. (Even though the thermostat 63 is mounted in temperature-sensing relationship to the coil 21 as shown in FIG. 3, such thermostat 63 is referred to as a fan thermostat because it controls operation of the fan motor 61.)

The thermostat 63 is normally open at a first fan thermostat temperature, e.g., 135° F., and all temperatures below such temperature. The thermostat 63 closes automatically when its temperature is elevated to a second fan thermostat temperature higher than the first fan thermostat temperature. In a specific embodiment, the second temperature is 150° F. And the fan thermostat 63 is of the type which re-opens automatically when its temperature diminishes to some value, e.g., 135° F., which is incrementally below the first fan thermostat temperature.

The distiller circuit 10 also has a heater circuit 65 mounted in and fixed with respect to the raw water vessel 15. The circuit 65 comprises a heater 67 and a heater thermostat 69 in series and during distilling, such heater circuit 65 is connected across the first and second lines 45, 47. The heater thermostat 69 is closed at a first heater thermostat temperature (and at all temperatures below such temperature) and automatically opens at a second heater thermostat temperature which is higher than the first heater thermostat temperature. An exemplary second heater thermostat temperature is 240° F.

After being reset as described below, the heater thermostat 69 remains closed at all temperatures below the second heater thermostat temperature. For purposes of explanation and assuming the second heater thermostat temperature is 240° F., it will be assumed that any temperature below, say, 235° F. is a first heater thermostat temperature. Notably, the heater thermostat 69 is of the type which, once opened by a rise in temperature at the conclusion of distillation, must be re-closed as by being manually reset, for example.

Referring particularly to FIGS. 1, 2, 4, 5B and 6, a highly preferred distiller 11 incorporates an innovative arrangement for connecting the heater circuit 65 and the fan circuit 59 to one another and for connecting the heater circuit 65 to a source of electrical power. The heater circuit 65 terminates in a male connector 71 having a pair of spaced-apart, electrically-conductive studs 73 projecting therefrom. (The grounding stud is omitted from FIG. 6.)

Figure 6:
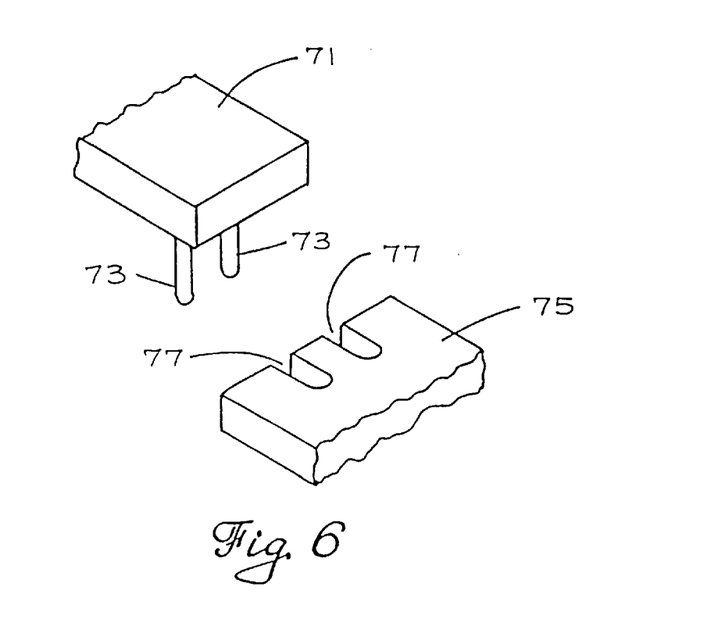
FIG. 6 is a representative perspective view of the male and female electrical connectors of the distiller. Parts are broken away.

The platform 13 has a female connector 75 with a pair of spaced-apart slots 77. Each slot 77 is around a respective spring-clip-type electrical contact 79 which is connected to a respective line 45, 47. The spacings of the studs 71 and slots 77 are cooperatively selected so that when the vessel 15 and its male connector 71 are moved along a substantially horizontal axis 81 and inserted into the platform 13, the studs 73 come into sliding, electrically-conductive engagement with the slot contacts 79.

Referring particularly to FIGS. 1, 2 and 4, proper positioning of the vessel 15 with respect to the platform 13 is aided by a platform stop 83 and a vessel stop 85. As the vessel 15 is moved along the axis 81, its stop 85 abuts the stop 83 at the relative vessel/platform position at which the studs 73 fully engage the contacts 79.

Referring particularly to FIGS. 1, 2, 5B and 7, it will be recalled from the foregoing that the heater thermostat 69 is of the type which must be reset at the conclusion of a distilling cycle. Another aspect of the invention involves a mechanism 87 for resetting such thermostat 69.

Figure 7:
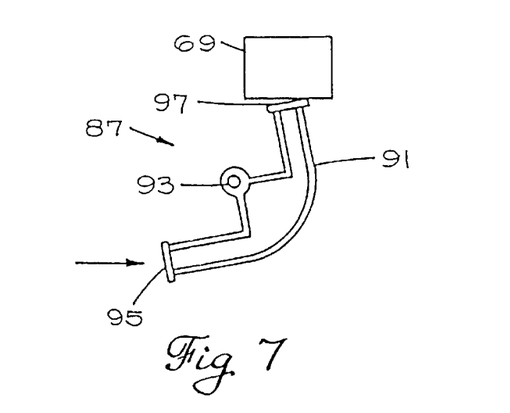
FIG. 7 is a side elevation view of the reset mechanism used in the raw water vessel.

In this part of the specification, it is assumed that the distiller has gone through a distilling cycle, at the conclusion of which the heater thermostat temperature has risen to what is referred to as the second heater thermostat 69 temperature. As a consequence, the thermostat has tripped so that its reset button 89 protrudes therefrom.

The reset mechanism 87 includes an actuator bar 91 which (in a particular orientation) is L-shaped and has a pivot axis or fulcrum 93 between the lever contact surface 95 and the thermostat reset surface 97. For easy access by the user of the distiller 11, the vessel 15 has a reset pushbutton 99 which interfaces with the contact surface 95 when the button is pressed. In FIG. 2, the lever bar 91 is in its first, repose position.

Under finger pressure applied to the button 99 and thence to the surface 95, the bar 91 pivots from the first position to the second or reset position shown in FIG. 7. When the bar 91 is so pivoted, its reset surface 97 urges the reset button 89 of the thermostat 69 upwardly to reset the thermostat 69.

In a highly preferred embodiment, the bar 91 is mounted and used as a first class lever having the contact surface 95 and the reset surface 97 spaced from one another. The lever fulcrum 93 is between such surfaces 95, 97.

Referring to FIGS. 1, 2, 3 and 4, in operation, the distiller 11 is plugged into a wall outlet 57 and the vessel 15 is filled with raw water and placed on the platform 13 as described above. If the heater thermostat 69 is not closed, such thermostat 69 is reset to closure as described above and the distillate container 17 is placed on the platform.

Since the heater circuit 65 is thereby connected across the lines 45, 47 the heater 67 is energized and the temperature of the water in the vessel 15 rises. (The fan motor 61 does not yet operate because the fan thermostat 63 is assumed to still be at a first fan thermostat temperature and is still open.) When the water boils and steam flows through the coil 21, the temperature of the fan thermostat 63 rises until such temperature is equal to the second fan thermostat 63 temperature whereupon the thermostat 63 closes and energizes the fan motor 61.

The heater thermostat 69, being at a first temperature, remains closed and distillation continues until the vessel 15 has only a small amount of water left in it. For reasons described below, the temperature of the heater thermostat 69 rises to its second temperature, the thermostat 69 opens and boiling stops. With no steam passing therethrough, the temperature of the coil 21 declines and with it, the temperature of the fan thermostat 63. When such thermostat 63 declines to its first temperature, the thermostat 63 opens and stops the fan motor 61.

AUTOMATIC SHUTOFF FEATURE

Figure 8:
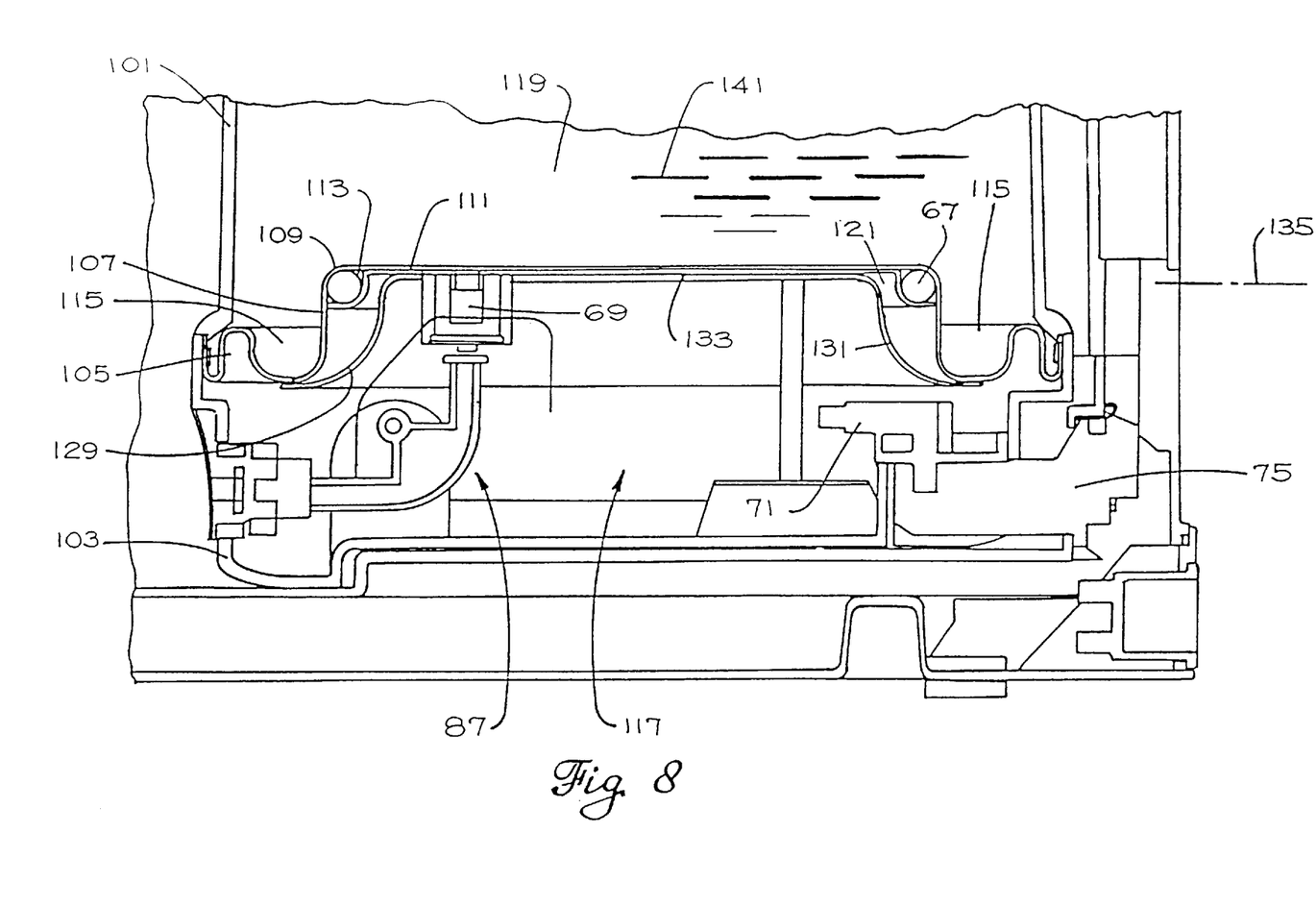
FIG. 8 is an enlarged view, in section, of a portion of the distiller shown in FIG. 2.

Referring now to FIGS. 2, 4, 5A, 5B and 8, the vessel 15 has a body component 101 and a support component 103 which "snap fit" to one another and, preferably, are made of ABS plastic. A profiled, stainless steel pan 105 is attached to the body component 101 and has a barrier member 107, an upper perimeter 109 and a substantially flat panel 111 circumscribed by the perimeter 109. The barrier member 107 and the panel 111 are generally at right angles to one another and define a groove 113 in which the heater 67 is seated and retained as described below. An annular residual water cavity 115 is defined by the pan 105 and the cavity 115 and the panel 111 are around and define a generally inverted cup-shaped region 117. FIG. 8 shows that the heater 67 is in the region 117 directly below the vessel chamber 119 in which water is boiled.

Figure 5A:
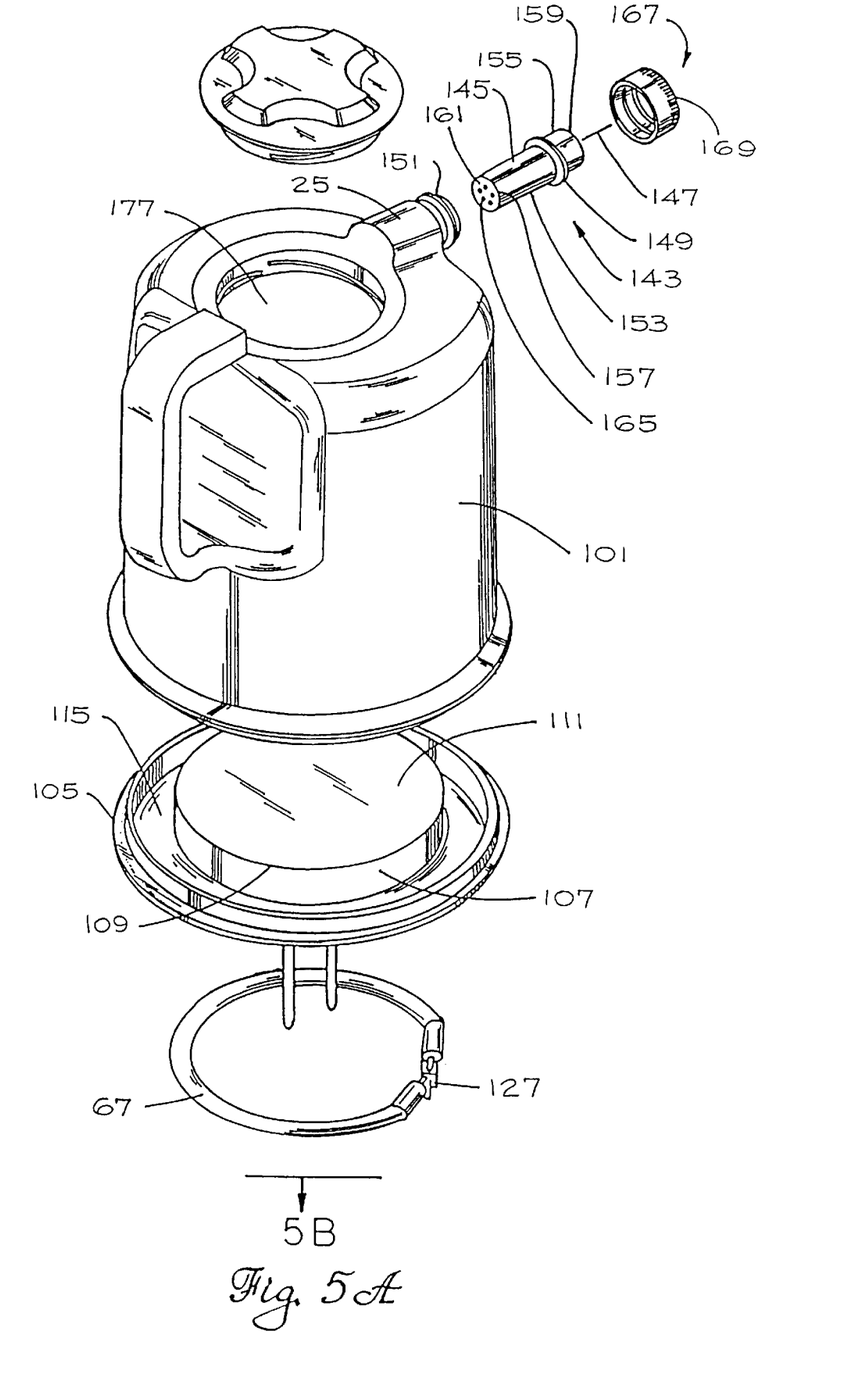
FIGS. 5A and 5B, taken together, comprise an exploded view of the raw water vessel container.
Figure 5B:
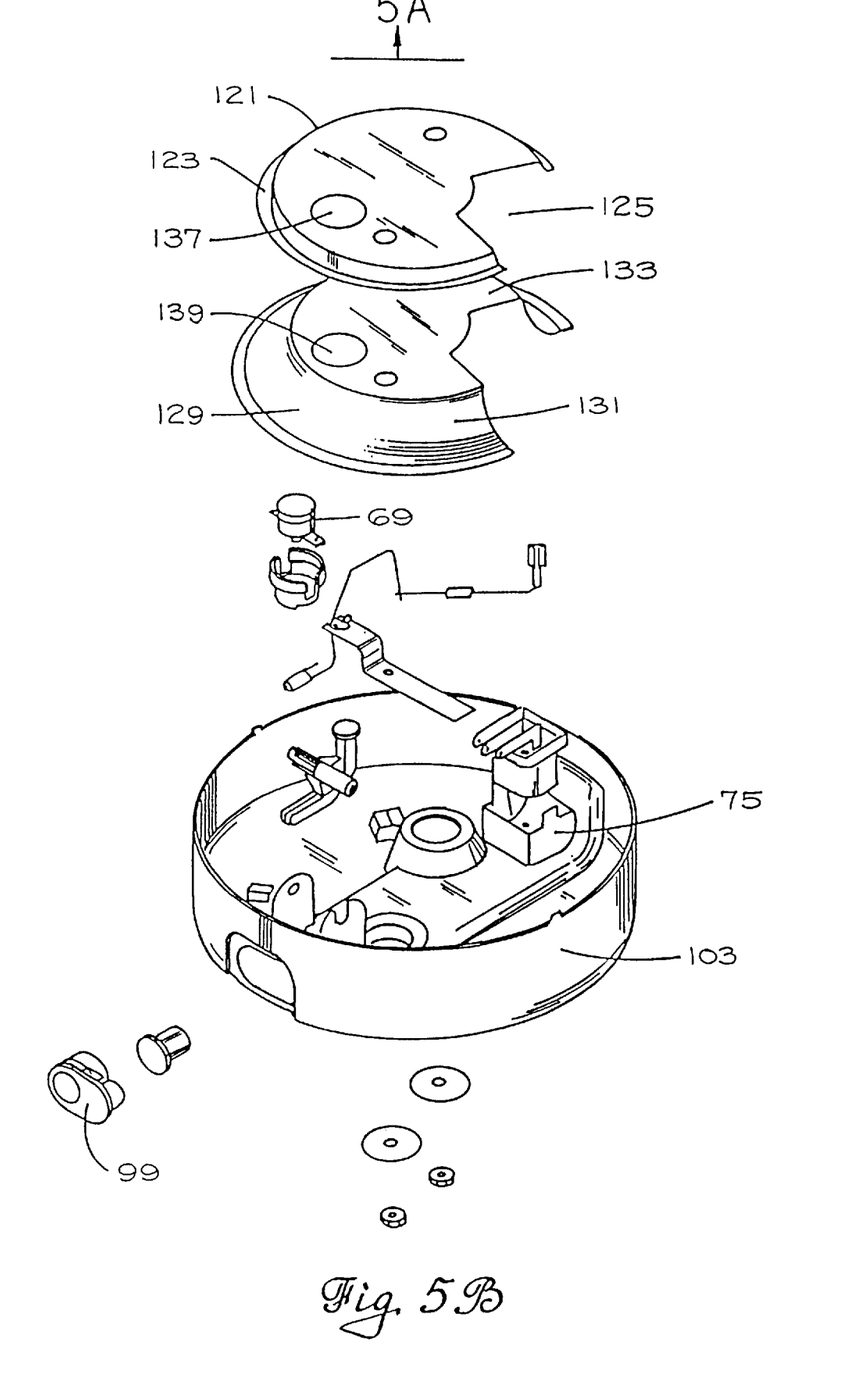

A heater retention member 121 includes a concave channel 123 which conformably fits around the heater 67. Such member 121 clamps the heater 67 between the member 121 and the panel 111 so that the heater 67 is in heat-transfer relationship to the panel 111. A cutout 125 in the member 121 accommodates the heater terminals 127. There is also a heat shield 129 which reflects heat toward the cavity 115. Such shield 129 has a first portion 131 spaced from the retention member 121 and a second portion 133 contacting the retention member 121. The heater 67 is between the panel 111 and the first portion 131.

The heater thermostat 69 is mounted in the region 117 in heat-transfer relationship to the panel 111 and is connected to the heater 67 to automatically shut off the heater 67 when the thermostat 69 opens. In a specific embodiment, the heater 67 and the thermostat 69 are in registry with a horizontal reference plane 135 which is spaced from and parallel to the panel 111. The retention member 121 and the heat shield 129 have, respectively, an aperture 137 and an opening 139 therethrough. The thermostat 69 projects upwardly through the opening 139 and the aperture 137 and, preferably, abuts the panel 111.

In addition to conserving heat by reflecting such heat back toward the chamber 119, the heat shield 129 also protects distiller components. Specifically, the electrical connector 71, 75 and the reset mechanism 87 are adjacent to and between the support component 103 and the shield 129. The heat shield 129, which is in non-contacting but heat-reflecting relationship to the heater 67, is interposed between the heater 67 (on one side of the shield 129) and the connectors 71, 75 and the reset mechanism 87 on the other side of the shield 129.

Referring to FIGS. 2, 4, 5A, 5B and 8, in operation, it is assumed the vessel 15 is filled with raw water 141 as described above and that distillation is underway. It is to be noted that during distillation, the panel 111 is covered by raw water 141 which holds the panel temperature to some value around that of the boiling point of water 141.

The raw water 141 boils away and, eventually, the panel 111 is uncovered and only a modest volume of water 141 remains in the cavity 115. At that point in the distillation cycle, the water level is about in registry with the panel 111. When the panel 111 is uncovered, its temperature is no longer held at or near water boiling temperature. Stated another way, the temperature of the panel 111 rises (recalling that the heater 67 is still energized) and with it, the temperature of the heater thermostat 69. When the temperature of such thermostat 69 reaches the second heater thermostat temperature, the exemplary 240° F., the thermostat 69 opens and disconnects electrical power from the heater 67.

DETACHABLE SOLIDS-REMOVING BAFFLE ARRANGEMENT

Referring now to FIGS. 1, 2 and 5A, a new, easily-removable baffle device 143 for the distiller 11 has an elongate tubular body 145 extending along a body axis 147. The body 145 has a radially-outwardly-projecting retention shoulder 149 around it and the radial "face width" of the shoulder 149 and its outer diameter generally correspond to the face width and outer diameter, respectively, of the raw water vessel nozzle end 151.

The device 143 has first and second tube portions 153, 155, respectively, extending in opposite directions away from the shoulder 149. Each tube portion 153, 155 is tapered from the shoulder 149 to the first and second body ends 157 and 159, respectively.

A plate-like baffle member 161 is fixed with respect to the body 145 and, more particularly, is fixed with respect to the first tube portion 153 and is at the first end 157. Such member 161 partially occludes the hole 163 through the body 145 and has a plurality of passages 165 therethrough. In a highly preferred embodiment, such passages are circular and coincident with a plane generally perpendicular to the nozzle 25 of the axis 147.

The baffle device 143 extends generally horizontally from the vessel 15. The baffle device body 145 extends within and is in telescoped engagement with the nozzle 25. The device 143 is removably secured to the nozzle 25 by a retention article 167 mounted to the nozzle by threads, for example. The article 167 has an annular, radially-inwardly-extending rim 169 which is in overlapping engagement with the retention shoulder 149 when the device 143 is mounted to and secured on the nozzle 25.

The raw water vessel 15 and baffle device 143 are used with the preferred water distiller 11 including its condensing platform 13. Such platform 13 has a steam receiving port 171 formed therein. When the vessel 15, with baffle device 143 attached, is positioned in the platform 13 for water boiling and distilling, the baffle device 143 extends between the port 171 and the nozzle 25 and connects them together for flowing steam therethrough. From the port 171, steam flows through the tube 27 and the coil 21 where it condenses into fresh, clear water 173.

The stops 83 and 85 mentioned above not only aid engagement of the studs 73 with the contacts 79. Such stops 83, 85 also "fix" the engagement of the baffle device 143 and the steam port 171. That is, when the vessel stop 85 abuts the platform stop 83, the user is assured that the second end 159 is properly inserted into the steam port 171. And such stops 83, 85 which are conformably U-shaped, have guide edges 175 extending parallel to the axis 81. Such edges 175 help assure that the raw water vessel 15 is orientated rotationally with respect to the distiller axis 81 so that the second end 159 is aligned with the steam port 171 and the studs 73 are aligned with the slots 77.

Referring to FIGS. 2 and 5A, in operation, it is assumed that distillation is underway and that steam is flowing through the raw water vessel nozzle 25 and, particularly, through the baffle device 143 in the nozzle 25 and through the baffle member 161. While not wishing to subscribe to any particular theory as to why "stripping" occurs, the member 161 causes dissolved solids to be stripped from the steam.

A particular advantage of the new baffle device 143 and related water vessel 15 is the ease of cleaning. Over time, removed impurities accumulate in the vessel 15, in the nozzle 25 and in the device 143. Since the device 143 is easily removed, both it and the nozzle 25 are easily cleaned. And the generously-sized vessel opening 177 makes vessel cleaning easy, as well.

While the principles of the invention have been shown and described in connection with a few preferred embodiments, it is to be understood clearly that such embodiments are by way of example and are not limiting.

What is claimed:

1. A removable baffle device for a distiller, comprising:
   a raw water vessel removably coupled to a condenser via the baffle device, the baffle device including:
   a tubular body having a first end, a second end, and a retention shoulder therearound for retaining the baffle device in position between the raw water vessel and the condenser; and
   a baffle member fixed at the first end of the tubular body for stripping dissolved solids from steam passing therethrough, such member being fixed with respect to the body and having a plurality of passages therethrough.

2. A baffle device for a distiller having a raw water vessel and a condenser removably coupled thereto via the baffle device, the baffle device comprising:
   a tubular body having a first end, a second end and a retention shoulder between the ends for retaining the baffle device in position between the raw water vessel and the condenser, the body tapering from the second end toward the retention shoulder and from the retention shoulder toward the first end; and
   a baffle member for stripping dissolved solids from steam passing therethrough, such member being fixed with respect to the body and having a plurality of passages therethrough, wherein
   the raw water vessel has a steam discharge nozzle; and
   the body is in telescoped engagement with the nozzle.

3. The baffle device as claimed in claim 2, further comprising a retention article in overlapping engagement with the retention shoulder, the retention article being mounted to the nozzle, thereby securing the body with respect to the nozzle.

4. A water distiller comprising:
   a condenser having a steam receiving port;
   a raw water vessel having a steam discharge nozzle; and
   a baffle device having a tubular body, a retention shoulder for retaining the baffle device in position between the steam receiving port and the steam discharge nozzle, first and second tube portions extending away from the shoulder, and a baffle member fixed in the first tube portion for stripping dissolved solids from steam passed therethrough, said baffle device extending between and releasably coupling the port and the nozzle.

5. The distiller of claim 4 wherein:
   a retention article engages the vessel and the retention shoulder, thereby securing the device with respect to the vessel.

6. The distiller of claim 5 wherein:
the first tube portion has a first end; and
the baffle member is at the first end.

7. A distiller apparatus comprising:
a condenser;
a raw water vessel;
a baffle device having a tubular shape and a baffle member with at least one fluid passage defined there for steam passing therethrough;
the condenser being releasably connected to the raw water vessel at and by the baffle device for stripping dissolved solids from steam passing therethrough, the baffle device establishing fluid communication between the condenser and the raw water vessel while the condenser is connected to the raw water vessel.

8. The distiller apparatus as claimed in claim 7, wherein the baffle member partially occludes one end of the baffle device.

9. The distiller apparatus as claimed in claim 7, wherein the raw water vessel has a body component defining a vessel chamber therein and a vessel output nozzle establishing fluid communication between the vessel chamber and surrounding environment of the raw water vessel, the vessel output nozzle sized and shaped to receive the baffle device therein.

10. The distiller apparatus as claimed in claim 9, wherein a first end of the baffle device is telescopingly received within the vessel output nozzle.

11. The distiller apparatus as claimed in claim 10, wherein the first end of the baffle device permits fluid flow through the baffle member, the fluid flow passing through the at least one passage formed through the baffle member.

12. The distiller apparatus as claimed in claim 7, wherein the baffle device is removable from the raw water vessel and the condenser.

13. The distiller apparatus as claimed in claim 7, wherein the baffle member is plate-shaped and has the at least one fluid passage formed therethrough.

14. The distiller apparatus as claimed in claim 7, wherein the baffle device has a retention shoulder secured between the condenser and the raw water vessel to secure the baffle device in place when the condenser and the raw water vessel are connected.

15. The distiller apparatus as claimed in claim 7, wherein the baffle device has an axial length, and wherein at least a portion of the baffle device is tapered along its axial length.

16. The distiller apparatus as claimed in claim 7, further comprising a retention member releasably connecting the baffle device to the raw water vessel.

17. A distiller apparatus, comprising:
a condenser;
a raw water vessel connected to the condenser, the raw water vessel being disconnectable and removable from the condenser:
a tubular-shaped baffle device releasably coupling the raw water vessel to the condenser and maintaining fluid communication between the condenser and the raw water vessel while the condenser and the raw water vessel are connected, the baffle device having a baffle member with at least one fluid passage defined therein for steam passing therethrough.

18. The distiller apparatus as claimed in claim 17, wherein the baffle member is plate-shaped.

19. The distiller apparatus as claimed in claim 17, wherein the baffle member has a closed end partially occludes one end of the baffle device.

20. The distiller apparatus as claimed in claim 17, wherein the baffle device is releasably connected between the raw water vessel and the condenser, permitting removal of the baffle device from the raw water vessel and the condenser.

21. The distiller apparatus as claimed in claim 20, wherein the baffle device is releasably connected to the raw water vessel via a retention article.

22. The distiller apparatus as claimed in claim 17, wherein the baffle device telescopingly extends within a nozzle in the raw water vessel.

23. A method for distilling water in a distiller, comprising:
coupling a raw water vessel to a condenser via a tubular-shaped baffle device, the baffle device having a baffle member and at least one fluid passage defined in the baffle member, the baffle device maintaining fluid communication between the raw water vessel and the condenser;
boiling water within the raw water vessel to generate steam;
passing the steam from the raw water vessel, through the at least one fluid passage in the baffle device to strip dissolved solids from the steam, and into the condenser;
de-coupling the raw water vessel from the condenser at the baffle device; and
removing the raw water vessel from the distiller.

\* \* \* \* \*